United States Patent [19]

Kaneko

[11] Patent Number: 5,499,363

[45] Date of Patent: Mar. 12, 1996

[54] MICROPROCESSOR COUPLED TO COPROCESSOR BY COPROCESSOR BUS SEPARATE FROM SYSTEM BUS TO EXTERNAL MEMORY FOR INCREASED EFFICIENCY

[75] Inventor: Hiroaki Kaneko, Tokyo, Japan

[73] Assignee: NEC Corporation, Tokyo, Japan

[21] Appl. No.: 400,390

[22] Filed: Mar. 3, 1995

Related U.S. Application Data

[63] Continuation of Ser. No. 215,663, Mar. 22, 1994, abandoned, which is a continuation of Ser. No. 83,870, Jun. 30, 1993, abandoned, which is a continuation of Ser. No. 474,262, Feb. 5, 1990, abandoned.

[30] Foreign Application Priority Data

Feb. 3, 1989  [JP]  Japan ........................................ 1-24858

[51] Int. Cl.$^6$ .................................................. G06F 13/00
[52] U.S. Cl. .................. 395/280; 364/228.6; 364/236.2; 364/238.4; 364/240.5
[58] Field of Search ..................................... 395/325, 375, 395/800

[56] References Cited

U.S. PATENT DOCUMENTS

| | | | |
|---|---|---|---|
| 4,509,116 | 4/1985 | Lacky et al. ............................ | 395/375 |
| 4,547,849 | 10/1985 | Louie et al. ............................ | 395/325 |
| 4,707,783 | 11/1987 | Lee et al. ............................... | 395/375 |
| 4,894,768 | 1/1990 | Iwasaki et al. ......................... | 395/375 |
| 4,926,318 | 5/1990 | Nakayama ............................. | 395/375 |
| 4,942,519 | 7/1990 | Nakayama ............................. | 395/375 |
| 4,979,102 | 12/1990 | Tokuume ................................ | 395/375 |

*Primary Examiner*—Kevin J. Teska
*Assistant Examiner*—Ayni Mohamed
*Attorney, Agent, or Firm*—Foley & Lardner

[57] ABSTRACT

A microprocessor, which can be coupled externally with a coprocessor in order to extend an instruction set, includes a first set of terminals to be coupled to the coprocessor for data transfer between the microprocessor and the coprocessor, and a second set of terminals to be coupled to an external memory other than the coprocessor for data transfer between the microprocessor and the external memory. The microprocessor also includes a first bus control unit connected to the first set of terminals for controlling the first set of terminals, independently of the second set of terminals, thereby to control the data transfer between the microprocessor and the coprocessor, and a second bus control unit connected to the second set of terminals for controlling the second set of terminals, independently of the first set of terminals, thereby to control the data transfer between the microprocessor and the external memory.

2 Claims, 5 Drawing Sheets

MICROPROCESSOR COUPLED TO COPROCESSOR BY COPROCESSOR BUS SEPARATE FROM SYSTEM BUS TO EXTERNAL MEMORY FOR INCREASED EFFICIENCY

This application is a continuation of application Ser. No. 08/215,663, filed Mar 22, 1994, now abandoned, which is a continuation of application Ser. No. 08/083,870, filed Jun. 30, 1993, now abandoned, which is a continuation of application Ser. No. 07/474,262, filed Feb. 5, 1990, now abandoned.

BACKGROUND OF THE INVENTION

1. Field of the Invention

The present invention relates to a microprocessor, and more specifically to a microprocessor which can extend an instruction by using a coprocessor externally coupled with the microprocessor.

2. Description of Related Art

In general, a microprocessor has to be assembled on a semiconductor chip of a limited size. Therefore, although performance of the microprocessor is sacrificed to some extent, an independent function is assembled on another chip or LSI which unit can be independent of and external to the microprocessor. With various functions assigned to different single-chip LSIs, it is possible to prevent the chip size of the microprocessor from being increased to a size which cannot manufactured under current techniques, and also to avoid an increase in cost caused by increase of the chip size.

Particularly, in microprocessors of 16 bits or more which have been required to have a great many function performance and a high degree of, microprocessor is closely coupled to various LSIs having a floating point arithmetic operation, a memory management mechanism, a memory buffer (cache) mechanism, and others. If these functions are assembled within the microprocessor, a system having a great many functions and a small size can be realized. However, these functions have been realized externally of the microprocessor for the reason as mentioned above.

An LSI provided externally to the microprocessor in order to extend an instruction set for the microprocessor is generally known as a coprocessor. Typical functions of this coprocessor include floating point arithmetic operation.

Conventional microprocessors of 4 bits and 8 bits and some types of microprocessors of 16 bits have had only instructions handling integers, because applications had been relatively simple. With expanding application fields, however, it is becoming necessary to execute floating point arithmetic operation at high speed. The conventional microprocessors have executed the floating point arithmetic operation in a software manner by combining instructions for handling integers, since the conventional microprocessors did not involve instructions for floating point arithmetic operations. As a result, the conventional microprocessors can have only a floating point arithmetic operation performance a great deal less than integer arithmetic operation performance.

In general, a coprocessor for floating point arithmetic operation is closely coupled to a microprocessor so as to execute floating point arithmetic operation in place of the microprocessor when the coprocessor itself detects or is notified from the microprocessor that the microprocessor is attempting to execute an instruction for the floating point arithmetic operation (actually, such a the microprocessor cannot execute the floating point arithmetic operation). When the coprocessor for the floating point arithmetic operation is in a condition of executing the floating point arithmetic operation, the microprocessor can execute an instruction other than the instruction for the floating point arithmetic operation.

For example, in a typical conventional system having a microprocessor coupled to a coprocessor for floating point arithmetic operation, the microprocessor of, for example 32 bits is coupled to an external memory and to the coprocessor for the floating point arithmetic operation through a data bus of 32 bits, an address bus of 32 bits and status signal lines. The status signal lines are used to provide notification of the types of bus cycle, timing signals, etc. generated by the microprocessor, to the coprocessor and the memory. On the other hand, the coprocessor outputs to the microprocessor a busy signal notifying it that the coprocessor is in a condition of executing the floating point arithmetic operation.

In brief, the microprocessor includes therein a bus control unit coupled to the data bus, the address bus and the status signal lines, an instruction decoder coupled to the bus control unit for decoding an instruction fetched by the bus control unit, and an instruction execution unit for executing the instruction decoded by the instruction decoder.

When an instruction other than that for the floating point arithmetic operation (called "normal instruction" hereinafter) is executed, the normal instruction is fetched from the external memory to the bus control unit of the microprocessor in an instruction fetch bus cycle, and decoded by the instruction decoder. As a result, the kind of an operation, the kind of operands (for example, the execution unit is notified of register/memory, read/write, etc.) and others.

When there is a memory read operand, the execution unit instructs the bus control unit so as to start an operand read bus cycle. An memory operand stored in the external memory is transferred (or read) to the bus control unit of the microprocessor in the operand read bus cycle. On the other hand, if there is a register operand, a general register ordinarily provided within the execution unit is selected as the operand.

After the memory operand is prepared in the bus control unit of the microprocessor, data of the memory operand is supplied to the execution unit of the microprocessor and an actual execution of the instruction is performed.

Then, if the execution unit of the microprocessor is previously notified by the instruction decoder of the microprocessor that the result of the instruction execution is returned to or written in the external memory, the execution unit operates to instruct the bus control unit so as to start an operand write bus cycle, and at the same time to transfer the result of the instruction execution (i.e., data to be written to the memory) to the bus control unit of the microprocessor. Thus, the result of the instruction execution is transferred (or written) to the external memory in the operand write bus cycle.

In the case of executing the floating point arithmetic operation, the same operation as that for a normal instruction is performed until the kind of operation and the kind of operands are notified by the instruction decoder.

Floating point data stored in the external memory ordinarily consists of 32 bits or more (64 bits or 80 bits), and therefore, cannot be all fetched to the bus control unit of the microprocessor in only one operand read bus cycle. Namely, a plurality of operand read bus cycles are required for completely fetching the floating point data. After the floating point data is completely fetched, the execution unit of the microprocessor instructs the start of a coprocessor operand write bus cycle, so that the floating point data temporarily stored in the bus control unit of the microprocessor is transferred (or written) to the coprocessor. This transfer in most cases also requires a plurality of bus cycles, for the reason as mentioned above.

On the other hand, the kind of operation decoded by the instruction decoder and supplied to the execution unit of the microprocessor is converted (or reconstructed) by the execution unit to a format (command) which can be decoded by the coprocessor. The command generated by the execution unit of the microprocessor is transferred to the bus control unit and, at the same time, the execution unit instructs the bus control unit so as to start the coprocessor write bus cycle.

If the command is transferred (or written) to the coprocessor in the coprocessor write bus cycle, the coprocessor starts an arithmetic operation of the floating point data which had been transferred before the transfer of the command.

When the coprocessor is in a condition of executing the arithmetic operation of the floating point data, the coprocessor outputs a busy signal to the microprocessor for notification that the coprocessor is in a busy condition. On the other hand, if the microprocessor detects the busy signal from the coprocessor, the microprocessor judges that the execution of the floating point operation instruction has not yet been completed, and therefore, the microprocessor cannot start execution of a next instruction. Namely, the microprocessor waits until the busy signal outputted from the coprocessor is brought into a ready condition.

When the coprocessor has completed execution of the floating point operation instruction, the coprocessor brings the busy signal into the ready condition, so that the microprocessor can know of the completion of the execution of the floating point operation instruction. At this time, similarly to the case of the execution of the normal instruction, if the execution unit has been notified by the instruction decoder that it is required to return the result of the operation to the external memory, the execution unit of the microprocessor then starts a coprocessor operand read cycle, so that the result of the operation is transferred (or read out) to the bus control unit once. Thereafter, the execution unit of the microprocessor instructs the bus control unit of the microprocessor so as to cause the bus control unit to transfer the result of the execution to the external memory in the operand write bus cycle.

As seen from the above, an assignment of the execution of the floating point operation from the microprocessor to the coprocessor requires the coprocessor operand write bus cycle, the coprocessor write bus cycle, and the coprocessor operand read bus cycle, which are inherently unnecessary to the microprocessor. As mentioned hereinbefore, each of the coprocessor operand write bus cycle and the coprocessor operand read bus cycle is performed twice or more in most cases, and therefore, there are many bus cycles which are inherently unnecessary to the microprocessor.

In addition, when an arithmetic operation (for example, addition) for two operands is to be executed, if both of the two operands are memory operands, the coprocessor operand write bus cycle is required for each of a first operand and a second operand.

For example, if floating point arithmetic operation is executed for two items of 64-bit length floating point data stored in the external memory, four coprocessor operand write bus cycles, one coprocessor write bus cycle and two coprocessor operand read bus cycles are required because the floating point arithmetic operation is executed by the coprocessor.

Recently, in order to elevate performance, some of microprocessors have adopted a so-called pipelined structure which can simultaneously treat a plurality of instructions, for example, by simultaneously processing a fetching of an instruction, a decoding of another instruction, and an execution of still another instruction, or by further increasing stages for these operations.

The pipelined system is advantageous in that since the processing of instructions can be divided into a number of stages, the apparent execution performance is increased. However, this advantage can be obtained by ensuring that an allocated instruction processing is performed in each stage without delay. For example, an ideal performance of the pipelined system cannot be obtained if there occurs a so-called pipeline hazard in which one stage requires the result of processing performed in a succeeding stage, or a bus neck in which a stage cannot start a necessary bus cycle because an external data bus indispensable to the pipelined system is in use by another stage.

As mentioned above, in a conventional microprocessor associated with a coprocessor, since an address bus are and a data bus commonly used by the microprocessor, an external memory and the coprocessor are occupied for some constant time for a data transfer required in floating point arithmetic operation, the bus neck has occurred.

Furthermore, if the coprocessor has high processing speed, the coprocessor quickly completes execution of its assigned operation. For example, a conventional coprocessor for a floating point arithmetic operation can process at the order of 10 clocks the four fundamental rules of arithmetic operations which are frequently used. On the other hand, the number of clocks for using the data bus has often exceeds the clock number for the arithmetic operation. This has been a serious problem since the microprocessor begins to have a large amount of overhead.

SUMMARY OF THE INVENTION

Accordingly, it is an object of the present invention to provide a microprocessor which has overcome the above mentioned defect of the conventional one.

Another object of the present invention is to provide a microprocessor which is used in combination with a coprocessor and which can increase availability of a system bus by an external device other than the coprocessor.

The above and other objects of the present invention are achieved in accordance with the present invention by a microprocessor which is to be coupled externally with a coprocessor in order to extend an instruction set, including a first set of terminals which are to be coupled to the coprocessor for data transfer between the microprocessor and the coprocessor, a second set of terminals which are to be coupled to an external device other than the coprocessor for data transfer between the microprocessor and the external device, a first control unit connected to the first set of terminals for controlling the first set of terminals, independently of the second set of terminals, thereby to control the data transfer between the microprocessor and the coprocessor, and a second control unit connected to the second set of terminals for controlling the second set of terminals, independently of the first set of terminals, thereby to control the data transfer between the microprocessor and the external device.

As seen from the above, in the system in accordance with the present invention, the second set of terminals of the microprocessor can be coupled to the external device through a system bus, and the first set of terminals of the microprocessor can be coupled to the coprocessor through an additional bus, different from the system bus. Therefore, the microprocessor can perform data transfer between the microprocessor and the coprocessor by use of the additional bus, without intermediary use of the system bus between the microprocessor and the external device. In other words, the data transfer bus between the microprocessor and the coprocessor is separated from the data transfer bus between the microprocessor and the external device. Therefore, the rate of use of the system bus between the microprocessor and the external device at the time of an instruction execution extended by the coprocessor, can be decreased. Accordingly, generation of a bus neck can be restrained. In a pipelined system, furthermore, since instruction processing can be smoothly performed in each stage of the pipelined system, the system can execute a stream of instructions with a small mount of overhead.

In addition, if the first set of terminals of the microprocessor are made to have the same structure as the second set of terminals, namely, if the additional bus coupled between the microprocessor and the coprocessor is made the same in structure as the system bus coupled between the microprocessor and the external device, the coprocessor which has been coupled to the system bus in a conventional system, can be coupled to the additional bus and hence the first set of terminals of the microprocessor, without modifying the coprocessor, and without modifying an interface of the coprocessor.

The additional bus between the microprocessor and the coprocessor is used only for coupling between the microprocessor and the coprocessor, and therefore, is permitted to have low driving current and has only a small lead capacitance, different from the system bus to be coupled with a large amount of bus resources including a memory, an input/output device, etc. Therefore, an interface of the coprocessor to be electrically coupled to the additional bus can be made very simple.

The above and other objects, features and advantages of the present invention will be apparent from the following description of preferred embodiments of the invention with reference to the accompanying drawings.

DESCRIPTION OF THE PREFERRED EMBODIMENTS

Figure 1:
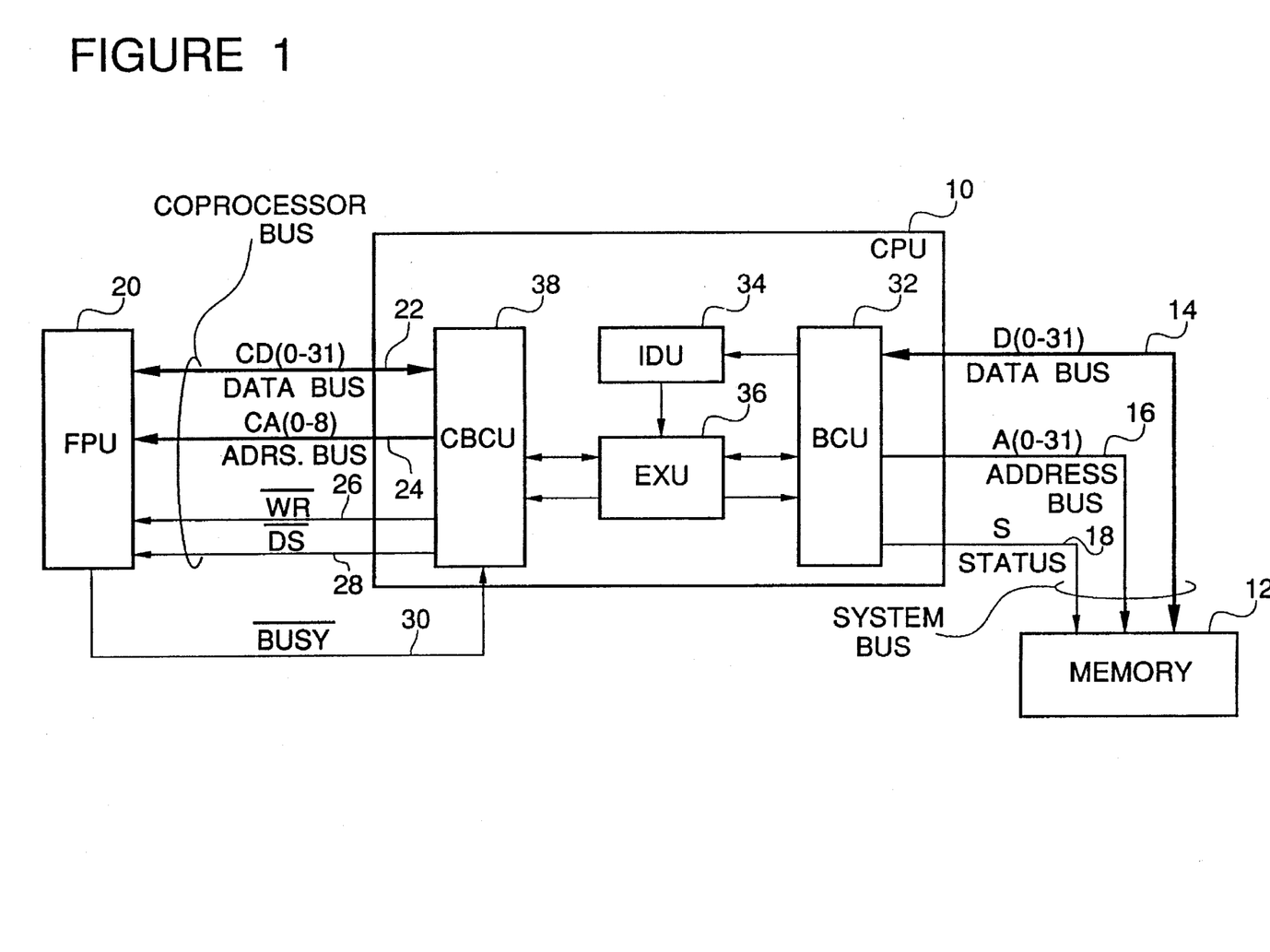
FIG. 1 is a block diagram of an embodiment of the microprocessor in accordance with the present invention coupled to a coprocessor.

Referring to FIG. 1, there is shown a block diagram of an embodiment of the microprocessor in accordance with the present invention coupled to a coprocessor.

A 32-bit microprocessor, which is generally shown by Reference Numeral 10 and is designated by "CPU" in the drawing, is coupled to an external memory 12 through a 32-bit data bus 14 ($D_{0-31}$) and a 32-bit address bus 16 ($A_{0-31}$). The CPU 10 is also coupled to the memory 12 through status signal lines 18 so as to output a group of status signals S including the kind of bus cycle, timing and others to the memory 12. The data bus 14, the address bus 16 and the status signal lines 18 will be generally called a "system bus" hereinafter.

A bus cycle executed by using the system bus is ordinarily composed of two clocks in both of a read cycle and a write cycle. However, the bus cycle can be extended to more than two clocks in response to a bus cycle extension request signal (not shown) generated by the memory 12.

A coprocessor for floating point arithmetic operation is generally shown by Reference Numeral 20 and is designated by "FPU" in the drawing. This coprocessor FPU 20 is coupled to the CPU 10 through a 32-bit data bus 22 ($CD_{0-31}$) and a 9-bit address bus 24 ($CA_{0-8}$). In addition, the coprocessor FPU 20 is coupled to receive a write signal $\overline{WR}$ and a strobe signal $\overline{DR}$ of the status signals from the CPU 10 through signal lines 26 and 28. These status signals $\overline{WR}$ and $\overline{DS}$ notify the coprocessor FPU 20 concerning the kind of bus cycle and the timing generated by the CPU 10. Here, the data bus 22, the address bus 24, the status signal lines 26 and 28 will be generally called a "coprocessor bus" hereinafter. On the other hand, the coprocessor FPU 20 outputs to the CPU 10 a busy signal $\overline{BUSY}$ indicating that the FPU 20 is in a condition of executing floating point arithmetic operation.

In brief, the CPU 10 includes a bus control unit 32 (designated by "BCU" in the drawing) for controlling generation of the bus cycle in the system bus, an instruction decoding unit 34 (designated by "IDU" in the drawing) for decoding an instruction code fetched by the BCU 32, an execution unit 36 (designated by "EXU" in the drawing) for actually executing the instruction decoded by the IDU 34, and a coprocessor bus control unit 38 (designated by "CBCU" in the drawing) for controlling generation of the bus cycle in the coprocessor bus.

The bus control units BCU 32 and CBCU 38 are controlled by the execution unit EXU 36. In particular, the coprocessor bus control unit CBCU 38 is controlled by the execution unit EXU 36 so as to generate a bus cycle for the coprocessor bus so that data transfer (read/write) is performed through the data bus 22 between the CPU 10 and the coprocessor FPU 30. Data to be transferred (or written) to the coprocessor FPU 30 is temporarily set in the coprocessor bus control unit CBCU 38 by the execution unit EXU 36. On the other hand, data to be transferred (or read) from the coprocessor FPU 30 is fetched by the coprocessor bus control unit CBCU 38 to the execution unit EXU 36.

Figure 2:
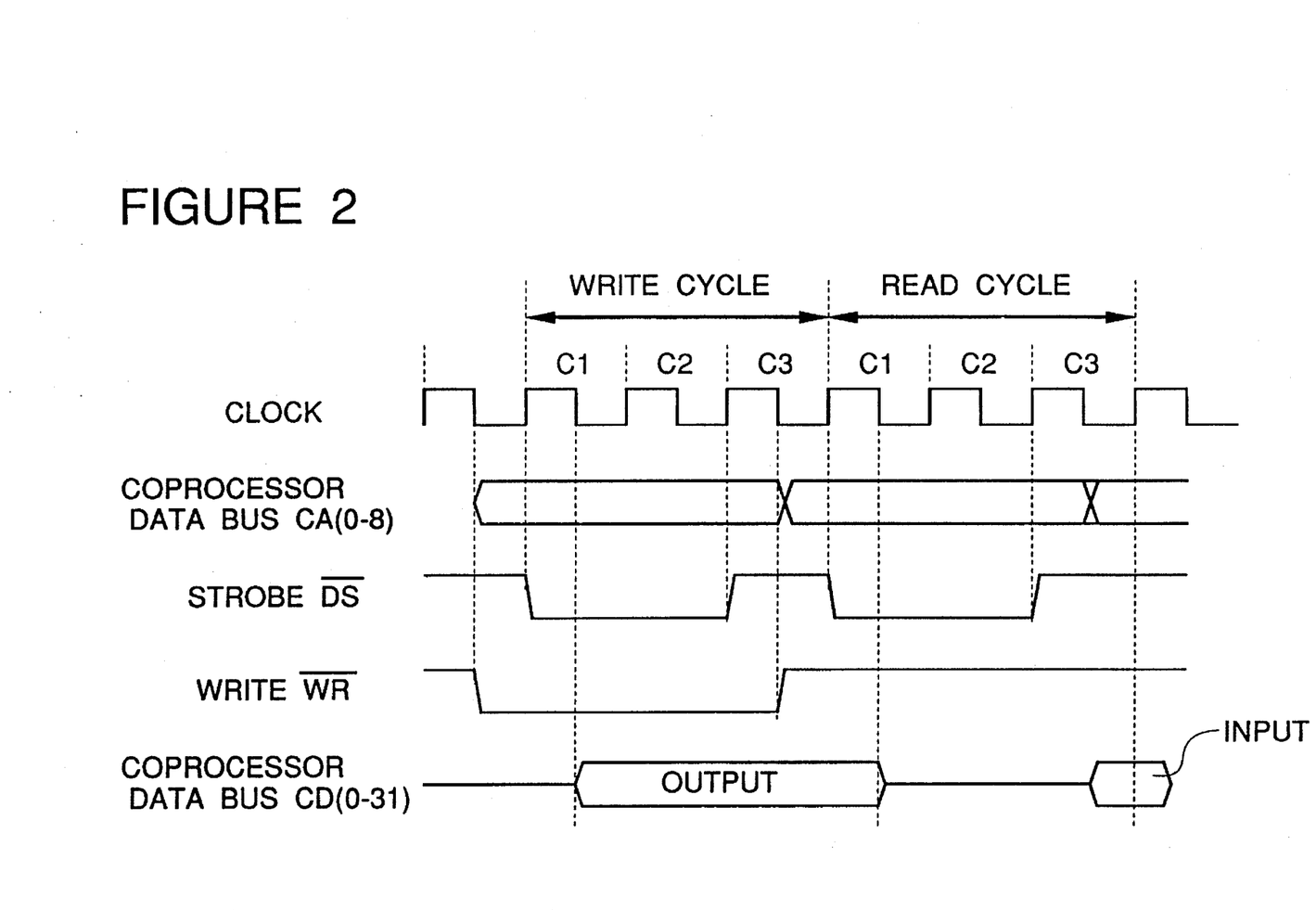
FIG. 2 is a timing chart illustrating the bus cycle for the coprocessor bus coupled between the microprocessor and the coprocessor in the system shown in FIG. 1.

The bus cycle generated for the coprocessor bus under control of the coprocessor bus control unit CBCU 38 is composed of 3 clocks (states C1, C2 and C3) in both of a read cycle and a write cycle as shown in FIG. 2. However, control for extending the bus cycle for the coprocessor bus is not performed, and therefore, the bus cycle for the coprocessor bus will terminate with three clocks without exception. In this regard, the bus cycle for the coprocessor bus is different from the bus cycle for the system bus. Accordingly, since control for extending the bus cycle is not required in the coprocessor bus control unit CBCU 38, the coprocessor bus control unit CBCU 38 can be constructed simply in comparison with the bus control unit BCU 32, and furthermore, an interface between the CPU 10 and the coprocessor 20 can have of a simple circuit and can be timed easily.

In the ease of reading from the coprocessor FPU 20 to the CPU 10, the content of an internal register (not shown) of the coprocessor FPU 20 designated by the address bus 24 ($CA_{0-8}$) is fetched through the data bus 22 ($CD_{0-31}$) to the coprocessor bus control unit 38 at an end of the state C3 as shown in FIG. 2. By detecting the high level of the write signal $\overline{WR}$ and a low level of the strobe signal $\overline{DS}$, the coprocessor FPU 20 can know that the read bus cycle is started by the CPU 10.

In the case of writing from the CPU 10 to the coprocessor FPU 20, data outputted onto the data bus 22 ($CD_{0-31}$) from the coprocessor bus control unit 38 is written into an internal register (not shown) of the coprocessor FPU 20 designated by the address bus 24 ($CA_{0-8}$), at an end of the state C3 as shown in FIG. 2. By detecting a low level of the write signal $\overline{WR}$ and a high level of the strobe signal $\overline{DS}$, the coprocessor FPU 20 can know that the write bus cycle is started by the CPU 10.

Since the address bus 22 of the coprocessor bus is composed of 9 bits, 512 different internal registers of the coprocessor FPU 20 can be read and written at a maximum by the address bus 22 ($CA_{0-8}$).

Now, operation of the system shown will be explained in detail. However, operation of the system in the case of executing a normal instruction is the same as that in the conventional microprocessor explained hereinbefore, and therefore, will be omitted for simplification of description.

Before explaining the execution of the floating point arithmetic operation, it is assumed for simplification of description that floating point data is composed of 32 bits, and an operand in question is stored in the memory 12. For example, it is assumed that them is given a "FADD.S reg.mem" instruction which instructs the addition of 32-bit floating point data stored in the memory to a value stored in a data register within the coprocessor FPU 20, and returning and writing the result of the addition into the memory.

The processing performed until the kind of operation and the kind of operand are notified to the execution unit EXU 36 from the instruction decoder IDU 34, namely, an operand address calculation and an instruction decoding, are the same as those in the conventional system.

Floating point data stored in the memory 12 is transferred (or read) to the bus control unit BCU 32 by an operand read bus cycle MEMR which is started under a request of the execution unit EXU 36. Then, the execution unit EXU 36 transfers the read data from the bus control unit BCU 32 to the coprocessor bus control unit CBCU 38, and at the same time, instructs the coprocessor bus control unit CBCU 38 to start a coprocessor operand write bus cycle CPOW.

For this coprocessor operand write bus cycle CPOW, a value for selecting a data port within the coprocessor FPU 20 has been loaded onto the coprocessor address bus 24, and with the coprocessor operand write bus cycle CPOW, the floating point data read from the memory is transferred to the coprocessor FPU 20 and written to the selected data port of the coprocessor FPU 20.

On the other hand, similarly to the conventional system, the kind of operation notified to the execution unit EXU 36 from the decoder IDU 34 for execution of the instruction, is reconstructed to a command by the execution unit EXU 36. This command generated by the execution unit EXU 36 is transferred to the coprocessor bus control unit CBCU 38, and the execution unit EXU 36 causes the coprocessor bus control unit CBCU 38 to start a coprocessor write bus cycle CPWR.

For this coprocessor write bus cycle CPWR, a value for selecting a command port within the coprocessor FPU 20 has been loaded onto the coprocessor address bus 24, and with the coprocessor write bus cycle CPWR, the command is transferred (or written) to the coprocessor FPU 20. As a result, the coprocessor FPU 20 starts the floating point additional operation on the basis of the floating point data transferred to the data port of the coprocessor FPU 20 prior to the supply of the command and the content of a data register selected by a designation included in the command transferred to the command port of the coprocessor FPU 20. In addition, the busy signal $\overline{BUSY}$ is brought to a low level, so that the execution of the operation in the coprocessor FPU 20 is detected by the execution unit EXU 36.

If the operation in the coprocessor FPU 20 is completed, the result of the operation is temporarily set in the data port of the coprocessor FPU 20, and at the same time, the busy signal $\overline{BUSY}$ is brought to a high level.

Since it has been notified by the decoder IDU 34 that after the operation of the coprocessor FPU 20 is completed, the result of the operation should be returned and written into the memory 12, the execution unit EXU 36 starts a coprocessor operand read bus cycle CPOR, so that the result of operation is transferred to the coprocessor bus control unit CBCU 38 once. For this coprocessor operand read bus cycle CPOR, a value for selecting a data port within the coprocessor FPU 20 has been loaded onto the coprocessor address bus 24.

Then, the execution unit EXU 36 transfers the result of operation to the bus control unit BCU 32, and causes the bus control unit BCU 32 to transfer (or write) the result of operation to the memory 12 by an operand write bus cycle MEMW.

Figure 3:
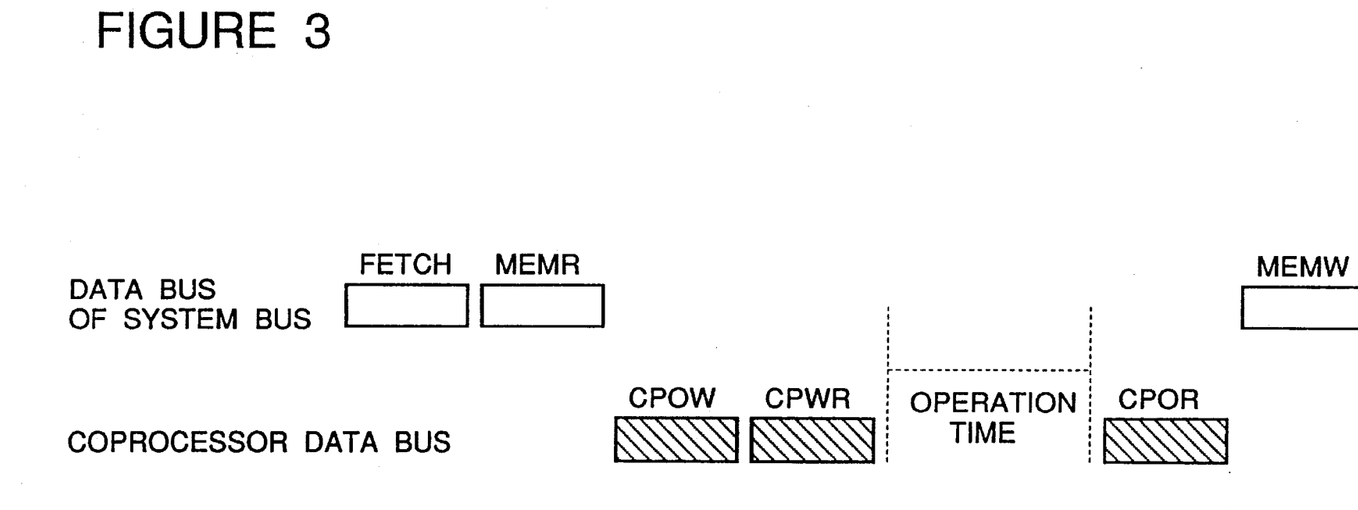
FIG. 3 illustrates the bus cycle realized in the system shown in FIG. 1.

Referring to FIG. 3, the above mentioned bus cycle realized in the system shown in FIG. 1 is illustrated. As seen from FIG. 3, the data bus 14 of the system bus is occupied by the bus cycles "FETCH", "MEMR", and "MEMW", and the coprocessor data bus 22 is occupied by the bus cycles "CPOW", "CPWR" and "CPOR". Namely, since the bus cycles "CPOW", "CPWR" and "CPOR" for transferring the floating point data, the command and the result of operation are executed by using the coprocessor bus, the available time of the system bus is increased in comparison with the conventional system in which the system bus has been occupied by all of the bus cycles "FETCH", "MEMR", "CPOW", "CPWR", "CPOR" and "MEMW". Accordingly, the CPU 10 can fetch an instruction code for an instruction next to the floating point arithmetic operation, or can access an memory operand, by utilizing the increased available time of the system bus, specifically a time after the bus cycle "MEMR" and before the bus cycle "MEMW".

Figure 4:
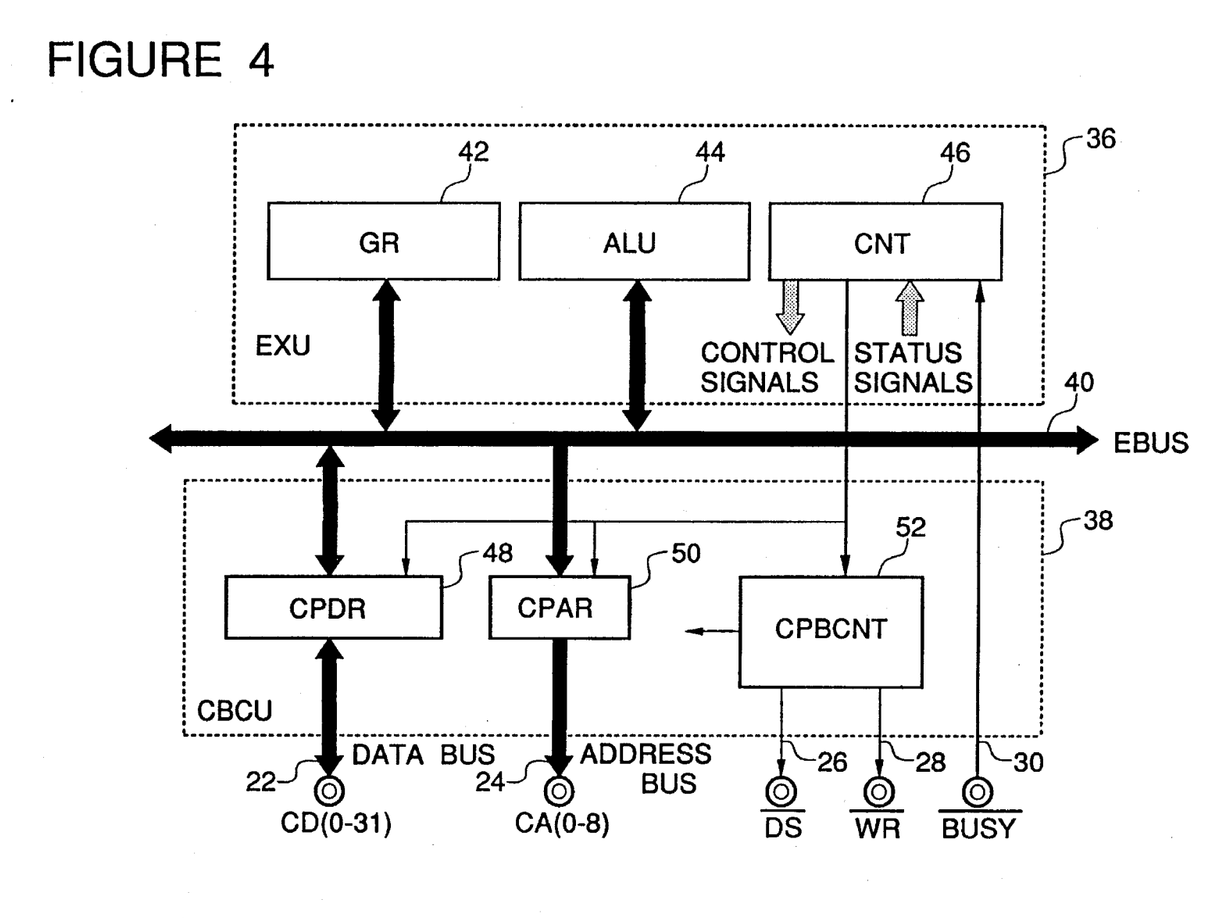
FIG. 4 is a block diagram illustrating an example of the execution unit and the coprocessor bus control unit in the microprocessor shown in FIG. 1.

Turning to FIG. 4, there is shown a block diagram illustrating an example of the execution unit EXU 36 and the coprocessor bus control unit CBCU 38. The execution unit EXU 36 and the coprocessor bus control unit CBCU 38 are coupled to an internal data bus EBUS 40 of 32 bits. The execution unit EXU 36 includes a general register group 42 designated by "GR" in the drawing and coupled to the internal data bus EBUS 40, an operation unit 44 designated by "ALU" in the drawing, having a binary arithmetic and logic unit therein and coupled to the internal data bus EBUS 40, and a controller 46 designated by "CNT" in the drawing. This controller CNT 46 operates to generate various control signals for internal resources within the execution unit EXU 36 and resources externally of the execution unit EXU 36, and to respond to various status signals so as to perform a sequence control. In ordinary cases, the controller CNT 46 is realized by using microprograms.

On the other hand, the coprocessor bus control unit CBCU 38 includes a 32-bit bidirectional latch 48 designated by "CPDR" in the drawing, and coupled to the internal data bus EBUS 40 and the coprocessor data bus 22, a 9-bit latch 50 designated by "CPAR" in the drawing, and having an input coupled to the internal data bus EBUS 40 and an output coupled to the coprocessor address bus 24, and a coprocessor bus cycle controller 52 designated by "CPBCNT" in the drawing. The bidirectional latch CPDR 48 is controlled by the control signals generated from the controller CNT 46, so as to latch data on the internal data bus EBUS 40, and to transfer the content of the bidirectional latch CPDR 48 itself to the internal data bus EBUS 40. The latch CPAR 50 is controlled by the control signals generated from the controller CNT 46, so as to latch nine lower bits of data on the internal data bus EBUS 40.

The coprocessor bus cycle controller CPBCNT 52 is controlled by the control signals generated from the controller CNT 46, so as to control a sequence for the coprocessor bus cycle, and also to generate the strobe signal DS and the write signal $\overline{WR}$. In addition, the coprocessor bus cycle controller CPBCNT 52 controls terminals of the latches CPDR 48 and CPAR 50 and latch timing of the latch CPDR 48 from the coprocessor data bus 22.

The busy signal $\overline{BUSY}$ is supplied to the controller CNT 46 together with the other status signals, so that it is utilized for the sequence control.

If the floating point data or the command transferred to the coprocessor FPU 20 violates a predetermined format, or if an exception such as an overflow occurs in the course of the operation of the coprocessor FPU 20, the coprocessor FPU 20 generates an error signal ERR (not shown) indicating detection of occurrence of the exception, to the execution unit EXU 36. In response to the error signal ERR indicating the occurrence of the exception, the execution unit EXU 36 reads (or transfers) through the coprocessor data bus 22 a status port of the coprocessor FPU 20 indicating the status of the coprocessor FPU 20, and then, performs exception processing.

In the above mentioned embodiment, the example of operation between the memory operand and the register operand has been explained. In this case, the data transfer is performed three times by using the coprocessor bus. If the three data transfers were performed by using the system bus as in the conventional system, at least six clocks (three transfers multiplied by two clocks) should have been lost. In a typical coprocessor which can execute floating point addition operation of 32 bits with eight clocks, the loss of the six clocks for the data transfer means a decrease to 60% in the processing performance. On the other hand, the above embodiment can ensure processing performance of 100%.

In the case of executing a 64-bit floating point addition operation between a memory operand and another memory operand, a transfer time of 12 clocks (three transfers×two bus cycles×two clocks) is required. In this case, the conventional system should have decreased the processing performance to 40%.

Furthermore, the above mentioned embodiment is not required to extend the bus cycle for the coprocessor in order to control the coprocessor bus, and therefore, an external circuit for extending the bus cycle in response to an access to the coprocessor is unnecessary. Accordingly, if the operation speed of the processor is too high, and therefore, if the bus cycle of the coprocessor bus is too high for accessing to the coprocessor, the bus cycle of the coprocessor bus control unit CBCU 38 can be extended by providing the CPU 10 with an input terminal which can allow selection of an extension of a fixed clock number bus cycle.

Figure 5:
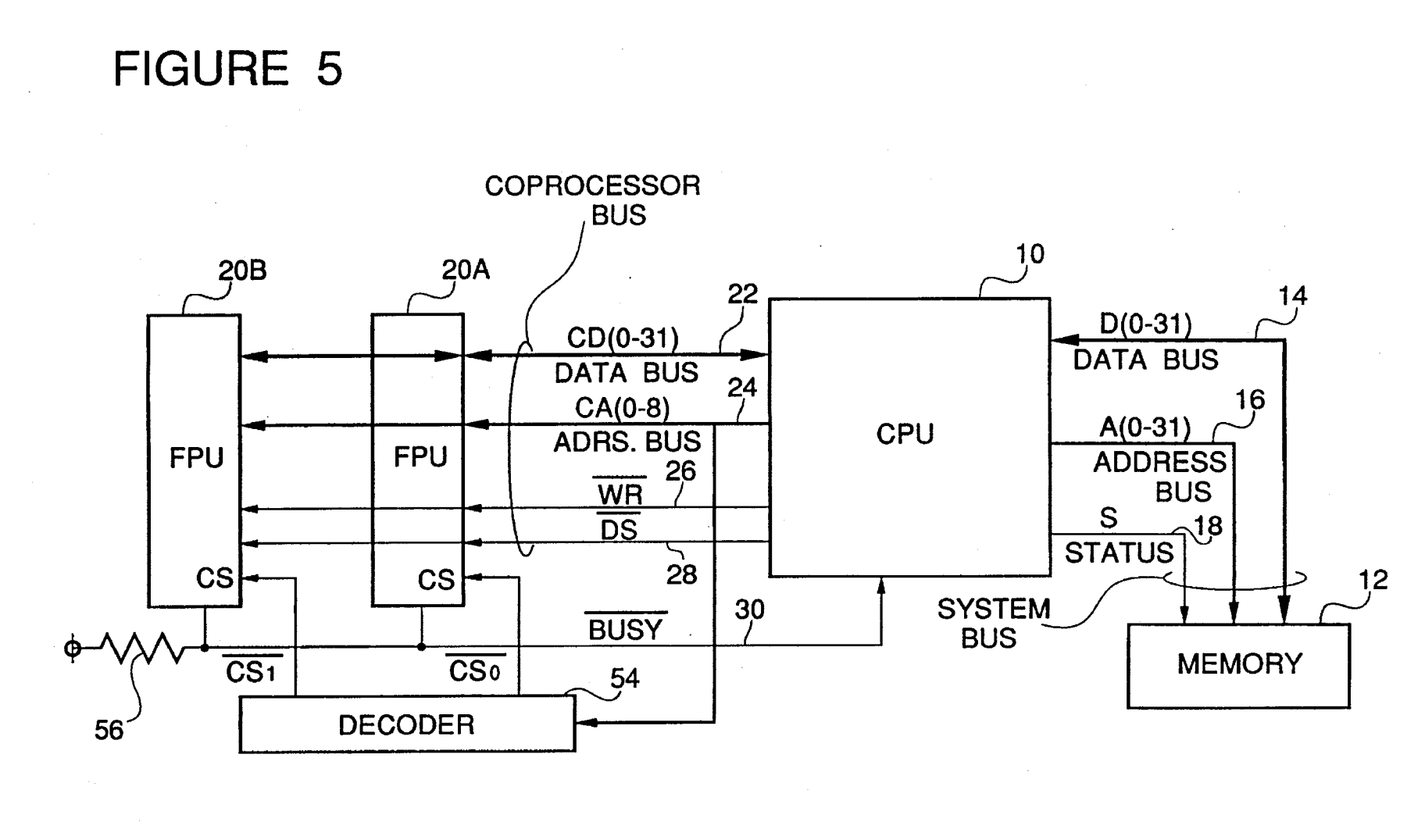
FIG. 5 is a block diagram of another embodiment of the microprocessor in accordance with the present invention coupled to a coprocessor.

In the embodiment shown in FIG. 1, the single coprocessor 20 has been coupled to the coprocessor bus. However, a plurality of coprocessors 20A and 20B each having a chip select terminal CS can be coupled commonly to the coprocessor bus, as shown in FIG. 5. In FIG. 5, elements similar or corresponding to those shown in FIG. 1 are given the same Reference Numerals, and explanation thereof will be omitted.

A portion of the coprocessor address bus 24 is coupled to a decoder 54, which generates a first chip select signal CS0 selecting the coprocessor 20A and a second chip select signal $\overline{CS1}$ selecting the coprocessor 20B. These chip select signals $\overline{CS0}$ and $\overline{CS1}$ are supplied to the chip select terminals of the coprocessors 20A and 20B, respectively. The decoder 54 can generate either or both of the chip select signals CS0 and $\overline{CS1}$ in accordance with the value on the coprocessor bus 24.

The busy signal terminals of the coprocessors 20A and 20B are commonly connected to the CPU 10 and pulled up by a pull up resister 56 to a high level. Namely, the busy signal terminals of the coprocessors 20A and 20B are connected to the CPU 10 through a wired OR circuit, so that if either of the coprocessors 20A and 20B is in a busy condition, the busy signal $\overline{BUSY}$ is applied to the CPU 10.

In the second embodiment, since a plurality of coprocessors are coupled to the single coprocessor bus, it is possible to simultaneously execute different floating point arithmetic operations, or to execute the same floating point arithmetic operation for different floating point data. Therefore, the second embodiment can have a floating point arithmetic operation capability higher than that of the first embodiment.

The invention has thus been shown and described with reference to the specific embodiments. However, it should be noted that the present invention is in no way limited to the details of the illustrated structures but changes and modifications may be made within the scope of the appended claims.

I claim:

1. A microprocessor system comprising:

a memory;

a coprocessor;

a system bus;

a coprocessor bus independent of said system bus; and a microprocessor including a first set of terminals coupled to said system bus, for transferring at least address information and data for said memory:

a second set of terminals independent of said first set of terminals coupled to said coprocessor bus, said coprocessor bus transferring at least address information and data between said coprocessor and said second set of terminals;

a first bus cycle control unit, coupled via said first set of terminals to said memory through said system bus, for data transfer between said microprocessor and said memory; and a second bus cycle control unit, independent of said first bus cycle control unit and coupled via said second set of terminals to said coprocessor through said coprocessor bus, for data transfer between said microprocessor and said coprocessor, wherein, when an operation is to be executed by said coprocessor, said first bus cycle control unit fetches, from said memory through said system bus, data required for said operation to be executed by said coprocessor, fetched data is transferred through said second bus cycle control unit to said coprocessor under control of said second bus cycle control unit, and after said operation has been executed by said coprocessor, a result of said operation is transferred from said coprocessor to said second bus cycle control unit and then returned through said first bus cycle control unit to said memory.

2. A microprocessor system as claimed in claim 1, further including:

an additional coprocessor coupled via said coprocessor bus to said microprocessor, each of said coprocessors executing an operation assigned thereto independently of the other coprocessor, each of said coprocessors further including a chip select input; and a decode circuit connected to said chip select input of each of said coprocessors and coupled to said coprocessors bus to activate said chip select input of a selected one of said coprocessors.

* * * * *